United States Patent
Kucharczyk et al.

(10) Patent No.: US 12,031,867 B2
(45) Date of Patent: Jul. 9, 2024

(54) SYSTEM AND METHOD FOR DETERMINING THE COLOR OF TEETH AND ATTACHMENT FOR USE IN THE SYSTEM

(71) Applicant: DENTSPLY SIRONA INC., York, PA (US)

(72) Inventors: Ronny Kucharczyk, Worms (DE); Frederike Franke, Darmstadt (DE); Björn Voss, Heidelberg (DE)

(73) Assignee: DENTSPLY SIRONA INC., York, PA (US)

( * ) Notice: Subject to any disclaimer, the term of this patent is extended or adjusted under 35 U.S.C. 154(b) by 488 days.

(21) Appl. No.: 17/291,004

(22) PCT Filed: Nov. 8, 2019

(86) PCT No.: PCT/EP2019/080681
§ 371 (c)(1),
(2) Date: May 4, 2021

(87) PCT Pub. No.: WO2020/094841
PCT Pub. Date: May 14, 2020

(65) Prior Publication Data
US 2021/0389182 A1 Dec. 16, 2021

(30) Foreign Application Priority Data
Nov. 8, 2018 (EP) .................................... 18205249

(51) Int. Cl.
*G01J 3/50* (2006.01)
*A61C 19/04* (2006.01)
(Continued)

(52) U.S. Cl.
CPC .............. *G01J 3/508* (2013.01); *A61C 19/04* (2013.01); *G01B 11/026* (2013.01); *G01J 3/524* (2013.01);
(Continued)

(58) Field of Classification Search
CPC ..... A61C 19/04; G01B 11/026; G01J 3/0272; G01J 3/0291; G01J 3/508; G01J 3/524;
(Continued)

(56) References Cited

U.S. PATENT DOCUMENTS

2013/0286174 A1* 10/2013 Urakabe .................. A61B 1/04
348/66
2014/0377715 A1* 12/2014 Rauscher ................ G01J 3/501
433/29
(Continued)

FOREIGN PATENT DOCUMENTS

CN       205181512 U     4/2016
DE      102009023952 A1    12/2010
(Continued)

OTHER PUBLICATIONS

International Search Report; PCT/EP2019/080681; Feb. 5, 2020 (completed); Feb. 13, 2020 (mailed).
(Continued)

*Primary Examiner* — Tri T Ton
(74) *Attorney, Agent, or Firm* — DENTSPLY SIRONA INC.

(57) ABSTRACT

The invention relates to a system and a method for determining the color of teeth or tooth surfaces, wherein the system comprises a 2D or 3D camera and an attachment on said camera, which sets a geometry of a captured image in such a way that, compared to capturing an image without the attachment, the distance, spatial angle and orientation of tooth surfaces relative to the camera are restricted. The
(Continued)

attachment according to the invention can in particular be fitted to the camera in a simple manner.

19 Claims, 4 Drawing Sheets

(51) Int. Cl.
*G01B 11/02* (2006.01)
*G01J 3/52* (2006.01)
*G06T 7/70* (2017.01)
*G06T 7/90* (2017.01)
*H04N 23/55* (2023.01)
*H04N 23/57* (2023.01)

(52) U.S. Cl.
CPC .................. *G06T 7/70* (2017.01); *G06T 7/90* (2017.01); *H04N 23/55* (2023.01); *H04N 23/57* (2023.01); *G06T 2207/30036* (2013.01)

(58) Field of Classification Search
CPC ... G06T 2207/30036; G06T 7/70; G06T 7/90; H04N 23/55; H04N 23/57
USPC .................................. 356/402–408, 411–425
See application file for complete search history.

(56) References Cited

U.S. PATENT DOCUMENTS

| 2017/0000591 | A1  | 1/2017 | Guillot |
|---|---|---|---|
| 2018/0028065 | A1* | 2/2018 | Elbaz ..................... G06T 17/00 |

FOREIGN PATENT DOCUMENTS

| WO | 0063661 | A1 | 10/2000 |
|---|---|---|---|
| WO | 0141632 | A2 | 6/2001 |
| WO | 2015082300 | A1 | 6/2015 |
| WO | 2016153834 | A1 | 9/2016 |
| WO | 2018142658 | A1 | 8/2018 |

OTHER PUBLICATIONS

International Preliminary Report on Patentability; PCT/EP2019/080681; Feb. 5, 2020 (completed); Feb. 13, 2020 (mailed).
Written Opinion of the International Searching Authority; PCT/EP2019/080681; Feb. 5, 2020 (completed); Feb. 13, 2020 (mailed).
Chinese Office Action dated Dec. 29, 2023.

* cited by examiner

SYSTEM AND METHOD FOR DETERMINING THE COLOR OF TEETH AND ATTACHMENT FOR USE IN THE SYSTEM

CROSS-REFERENCE TO RELATED APPLICATIONS

This is a National Phase application of International Application No. PCT/EP2019/080681, filed Nov. 8, 2019, which claims the benefit of and priority to EP Application Ser. No. 18205249.8, filed on Nov. 8, 2018, which are herein incorporated by reference for all purposes.

TECHNICAL FIELD

The invention relates to a system and a method for determining the color of teeth and an attachment for use in the system.

BACKGROUND OF THE INVENTION

Color determination to determine an aesthetically matching color tone for dental crowns and tooth replacements has to date been largely performed using an analogous process, wherein a practitioner compares the adjacent teeth or the tooth to be replaced with specified color patterns (e.g. VITA classical A1-D4® shade guide) and approaches the matching color in this way. If this process is not carried out correctly, it results in a restoration that does not match the existing tooth situation with respect to color. If the restoration does not match with respect to color, work has to be redone and new patient appointments are required.

Perfect color reproduction has also become increasingly important for patients and is now part of a systematic process chain of color determination, color communication, color reproduction and color control.

This process includes many variables and sources of error, such as fatigue of the eyes of the practitioner, the effect of artificial lighting, etc. For this reason, devices which digitally determine the tooth color have been developed specifically for color determination. It has also recently become possible for color of teeth to be measured using a 3D intraoral scanner. Such a 3D intraoral scanner is offered by Sirona Dental Systems GmbH, for example, under the name CEREC Omnicam.

Relatively expensive, such 3D scanners are not available in every dental office yet, however. But most dental offices do already have more affordable 2D intraoral cameras, with which color determination has previously not been possible. Using conventional intraoral cameras, a dentist can take photographs and videos in the mouth of a patient but cannot determine color. There are currently also various 3D intraoral cameras, with which color determination is not yet possible.

WO 2018/080413 A2 describes a light isolation apparatus which can be fitted to a camera or smartphone or tablet, wherein image data of teeth or their color recorded by the camera can be compared with reference tooth colors.

The object of the present invention is therefore to provide a system to accurately determine the color of teeth, in particular tooth surfaces, for the production of dental restorations of teeth, which is simple and cost-effective in design and easy to use. A method with which an accurate determination of the color of teeth is easily possible is to be provided as well. An attachment, which can be used in a system for accurate color determination for a restoration of teeth, is furthermore to be provided too.

According to the invention, a system for determining the color of teeth is provided which comprises a 2D or 3D intraoral camera and an attachment on said camera, wherein the attachment sets the geometry of a captured image in such a way that a distance from the camera to the tooth surface to be measured, the spatial angle captured by the camera and the orientation of the tooth surface to be measured relative to the camera are restricted in comparison to a use of the camera to capture an image in the conventional manner without an attachment.

A specific section of the tooth surface can therefore be captured, the distance of which to the camera and the relative orientation of which to the camera is optimum for the color measurement process, thus making a good determination of the tooth color possible.

The geometry of the recorded tooth surface, namely the distance from the camera to the tooth surface to be measured, the spatial angle captured by the camera and the orientation of the tooth surface to be measured relative to the camera are controlled by means of the attachment of the present invention. The alignment and the relative position of the camera to the tooth surface, and also the size of the captured surface, are thus set. Since a generic 2D camera also comprises integrated lighting, the distance of the lighting to the tooth surface and the direction of incidence relative to the surface and to the camera are implicitly defined by the attachment as well.

The advantage of this invention lies in the fact that a 2D or 3D camera that is already available in the dental office can be used for the color determination. The dentist thus has access to an affordable digital medium that can be used in a system for color determination, which is already available in the dental office or integrated into the treatment unit. He does not have to purchase any other individual devices that always have to be brought into the treatment room, powered up and are, in part, quite expensive to procure.

SUMMARY OF THE INVENTION

A measurement of tooth colors is carried out using a 2D camera. In doing so, unlike in the case of a color measurement using a 3D camera, the 3D geometry is not also recorded and included in the calculation of the color. Instead, with the attachment on the 2D camera, the alignment and relative position of the camera and the lighting to the tooth are set such that the distance, the captured spatial angle and the orientation of the camera relative to the tooth surface, and with it also the orientation of the lighting and the detecting sensor, are restricted in comparison to a measurement with a camera without using an attachment.

A measurement of tooth colors can also be carried out with a 3D camera, if said camera is capable of simultaneously recording 2D color images and 3D data. In particular, camera systems in which contrast powder is used for 3D measurements are generally not capable of correctly determining tooth color, so that the use of the attachment previously described in relation to a 2D camera is helpful for determining tooth colors.

The attachment in particular comprises a spacer with a connecting means, such as a click connection or a plug connection, for simple fitting to the camera. It is therefore advantageously possible to fit an attachment onto the camera quickly and easily for a color determination.

On the spacer, the attachment in particular comprises an aperture in the form of a pinhole or slot aperture, via which the camera captures an image of the teeth. As a result of the spatial position of the aperture in the recording region of the camera, the distance, the captured spatial angle and the orientation in relation to the camera are advantageously restricted when it is placed onto the tooth surface, as is desired for determining the color of teeth.

The attachment in particular at least partially comprises a silicone support fitted to the front side. Said silicon support can conform at least partially to the tooth surface during placement, as a result of which it cannot slide away. Due to its flush fit on the tooth, the silicone support can also prevent the entry of interfering scattered light, which ultimately makes a more accurate color determination of the respective tooth possible, so that the captured color can then be used without further correction for the color design of a tooth replacement.

The spacer in particular comprises imaging optics, which are inserted into the pinhole or slot aperture or arranged behind the pinhole or slot aperture. The imaging optics can advantageously enlarge the image of the captured region on the detecting sensor of the camera. The color information from the pinhole could thus be magnified and therefore measured using a greater number of pixels and a more robust result could be achieved. The imaging optics can optionally fill the pinhole or slot aperture completely. According to the invention, however, imaging optics are not absolutely necessary.

The system in particular comprises means for color calibration, which comprise software and/or hardware. The system is advantageously calibrated by means of software, which is provided separate from the system and is respectively added to said system or is provided in the system as a software module.

The hardware means, in particular, comprising a color pattern composed of reference colors. However, it is also possible to use only white as a reference color.

The system, in particular, receives input data as color images which are captured by the camera, or as data which is based on the images. Captured images can thus advantageously be processed and used for color determination.

The system, in particular, detects changes in the image field captured by the camera and consequently switches to color measurement or to a color measurement mode. A color measurement can therefore be carried out advantageously quickly and without additional intermediate steps.

With said system, a color measurement is in particular initiated automatically or by means of foot switches. With the system according to the invention, a color measurement can thus advantageously be initiated intentionally when a foot switch is actuated, or automatically when no shaking or a uniform color is detected by the 2D camera.

The system in particular analyzes the acquired data on the basis of a color calibration and outputs the result in the standard colors of manufacturers of material for tooth replacements. A color selection for material for tooth replacement can thus advantageously be carried out automatically.

The system in particular comprises a color calibration set with target colors for calibration. The color calibration set is preferably designed as a color pattern with a variety of target colors for calibration. Such a color pattern is preferably mounted on the inner side of the attachment, in particular in the direct vicinity of the pinhole or slot aperture. By providing such a color calibration set, color matching, including a calibration, of the captured image can be carried out in parallel during every recording of a tooth color via the pinhole or slot aperture. Aging and temperature effects, the latter of which are caused by the camera-internal light source, for example, can be compensated or corrected by means of a color calibration set mounted on the inner side of the attachment. Aging effects of the image sensor of the camera, for example, can also be compensated or corrected in this manner. Changes in the system, in particular aging effects, can also be compensated or corrected by means of an external color calibration set.

The invention further provides a method for color determination for a restoration of teeth, wherein an attachment is fitted to a 2D or 3D camera, the geometry of the image to be captured is set by the attachment in such a way that the distance from the camera to the surface to be measured, the orientation of the surface to be measured relative to the camera and the lighting as well as the spatial angle for capturing are restricted, and an image of a geometrically defined specific section of teeth or a tooth is captured intraorally by means of the camera in conjunction with the attachment.

By fitting an attachment and subsequently setting the geometry of an image to be captured by the camera, an existing 2D or 3D camera can advantageously be used to accurately determine the color of teeth.

A color calibration is, in particular, carried out by capturing an image consisting of different reference colors. Using known reference colors, a target/actual comparison can be carried out and any deviations can be compensated or corrected.

The reference colors for a color calibration are preferably acquired directly before, during or after each color determination for a tooth, as a result of which a calibration of the system can be carried out virtually in real time. In such a case, the reference colors are integrated into the attachment. The system can alternatively be calibrated at time intervals without the performance of a color determination for a tooth directly before, during or after. To do this, an attachment provided with reference colors is preferably placed on the camera at predetermined intervals, for example one week, and a calibration is performed.

The acquired data is in particular analyzed on the basis of the color calibration and the result of the analysis is output in the standard colors of manufacturers of material for tooth replacements. A selection of a color for material for tooth replacement can thus advantageously be carried out automatically.

The invention further provides an attachment for use in a system according to the invention, which comprises a spacer, connecting means for fitting the attachment onto a 2D or 3D camera and a pinhole or slot aperture, via which the camera captures an image of teeth, wherein the spacer creates a distance between a capture device of the camera and the pinhole or slot aperture.

The attachment can advantageously be fitted to an existing camera without much effort and can be used in conjunction with said camera for an accurate color determination for a restoration of teeth.

Further, in an alternative embodiment of before mentioned system, said attachment can be characterized in that the camera has at least one camera opening and the attachment comprises at least a holder, which provides a light tight connection to an area of the at least one camera opening, which is circumferential to said camera opening; and an adapter connected light tight to the holder and comprising at least one front side in front of the camera opening at the distal end to the camera opening of the optical path of the attachment, comprising at least one aperture and/or opening and a support at least partially adjacent the aperture. This embodiment offers the advantage, that different adapters can be attached to the holder, with for example but not limited to, different apertures and/or color reference patterns. Further, the light tight connection of the holder to at least the circumference of the camera opening prevents that light from other sources than the internal camera lighting interferes with during the color determination process.

As before mentioned, also within in this or other embodiments of the invention the holder is attached to the camera by a clamping and/or latching and/or sliding and/or click and/or ring and/or plug mechanism element and/or wherein the holder is removable connected to the camera.

In particular the holder can comprise a holder opening corresponding at least to the camera opening and at least one bearing surface and/or formfitting profile following the shape of the casing in which the camera opening is arranged providing a light tight connection to the at least one camera opening and wherein said at least one bearing surface and/or form-fitting profile enables the correct positioning of the attachment on the camera corresponding to the camera opening.

Additionally, the adapter can comprise at least one reference pattern facing to the at least one camera opening, preferably located next to or around the aperture and/or opening of the front side.

Further within the before mentioned alternative embodiment or other embodiments of the invention the at least one aperture and/or opening can have different shapes, preferably a rectangular shape or circular shape and/or has a cross section area equal to or smaller than 0.5 cm$^2$, preferably smaller than 0.35 cm$^2$ or even more preferably smaller than 0.15 cm$^2$ but not less than 0.01 cm$^2$.

In general, it is preferred within the invention, that the at least one support
- comprises an elastic material, preferably silicone and/or an elastomer;
- circumferentially encloses the at least one aperture and/or opening; and/or
- is part of the front side, wherein the front side is made at least partially in areas of soft and/or elastic material; and/or
- the front side is formed as of at least two layers, wherein at least the layer facing to tooth surface is made of an elastic or soft material, preferably an elastomer or soft plastic; and/or
- is recessed or protruding the front side; and/or
- is at least one area of the front side provided with a contour, preferably a riffled and/or other friction or grip increasing contour.

Additionally, the before mentioned alternative embodiment, but also other embodiments according to the invention can comprise an attachment comprising a transition piece as spacer, wherein the spacer is,
- a separate component, light tight connected by connecting means to the adapter and the holder; or
- comprised partially by the adapter and the holder; or
- comprised completely by the adapter or the holder; or
- is comprised in a one-part element serving as attachment, comprising holder, spacer and adapter.

Preferably, the connecting means of the adapter, the holder and/or the spacer are formed as clamping and/or latching and/or sliding and/or click and/or ring and/or plug mechanism elements and/or are removable.

Finally, the spacer length of embodiments according to the invention can be adjusted with respect to the optical focal plane of the camera, so that the color reference pattern and/or aperture is located close to the focal plane of the camera, preferably within the focal plane of the camera.

With the system, the method and the design according to the present invention, accurate color determinations can be carried out easily, without the need for a user to make major investments.

BRIEF DESCRIPTION OF THE DRAWINGS

The specified and further features and particulars of the invention will become clearer to a person skilled in the art in the field from the following detailed description and the attached drawings, which show the features of the present invention based on an example and wherein.

DETAILED DESCRIPTION OF THE INVENTION

The present invention is explained in detail in the following, using preferred embodiments and with reference to the figures.

Figure 1:
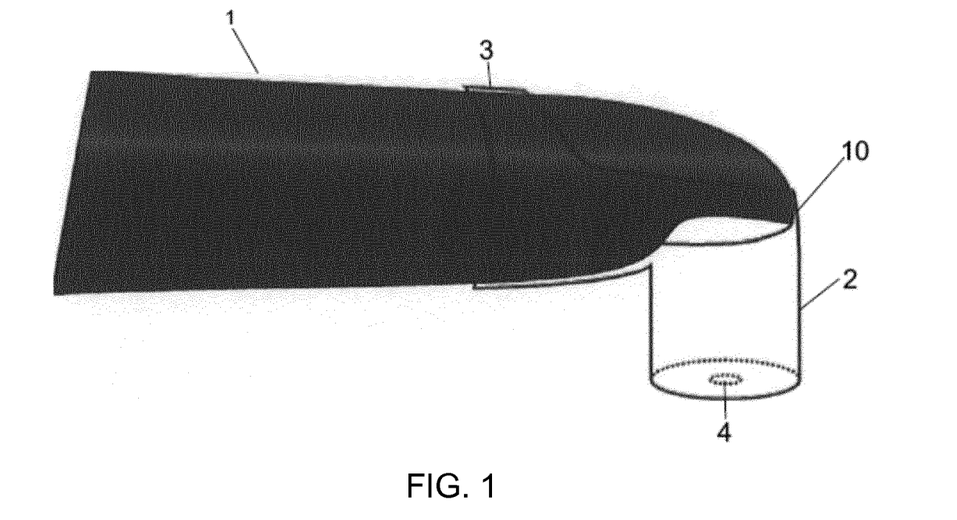
FIG. 1 shows a general design of a system according to the invention having an attachment, which includes a spacer, connecting means and a pinhole aperture.

FIG. 1 shows a general design of a system according to the invention for the intraoral color determination of teeth or tooth surfaces with a camera 1 and an attachment 10. As can be seen in FIG. 1, the attachment 10 comprises a spacer 2, connecting means 3 and an aperture 4. The aperture 4 is preferably configured as a pinhole aperture. A slot aperture (not shown) can alternatively be provided as well. On the front side facing the object to be measured, the attachment 10 can be provided with a silicone support as will be explained in the following.

A camera, in particular a 2D camera, which is already available in the office of a dentist, can be used for the color determination. The dentist thus has access to a digital medium that can be used in a system for color determination, which is already integrated into the treatment unit. He does not have to purchase any other individual devices that always have to be brought into the treatment room, powered up and are, in part, quite expensive to procure.

The attachment 10 can in principle also be used with a 3D camera, if said camera is capable of taking 2D color images. In particular for 3D camera systems that use contrast powder for 3D measurements, the attachment would provide real added value, because these camera systems are otherwise not capable of determining the tooth color with sufficient accuracy.

A measurement of tooth colors is preferably carried out using the 2D camera 1, wherein, unlike a color measurement using a 3D camera, the 3D geometry is not also recorded and included in the calculation of the color. Instead, with the attachment 10 on the 2D camera 1, the geometry is set such that the distance, the spatial angle and the orientation of the camera relative to the surface to be captured are restricted in comparison to a measurement with a camera without using an attachment.

A measurement of tooth colors can also be carried out with a 3D camera, if said camera is capable of taking 2D color images. Particularly camera systems in which contrast powder is used for 3D measurements are generally not capable of correctly determining tooth color, so that the use of the attachment described in relation to a 2D camera is helpful for determining tooth colors.

The attachment 10 in particular comprises a spacer 2 with a connecting means 3, such as a click connection or a plug connection, for simple fitting to the 2D camera 1. The attachment 10 can thus be fitted onto the 2D camera 1 quickly and easily for a color determination.

On the spacer 2, the attachment 10 comprises the aperture 4, via which the 2D camera 1 captures an image of the teeth. The provision of the aperture 4 advantageously restricts the captured distance and angle, as is desired for the color determination of teeth.

In any case, the aperture 4 is configured and spaced apart from the surface to be measured such that the captured surface is smaller than half the average surface of one of the smaller teeth, preferably an incisor. In general, the system can be used to capture the color of every tooth, such as for example an incisor, a canine or a molar. The captured surface is preferably less than 0.5 cm$^2$. The captured surface is particularly preferably in the range between 0.15 and 0.3 cm$^2$. Be that as it may, the restriction of the captured surface is intended to ensure that only the tooth surface itself is captured, and not adjoining areas such as the gums or areas beyond a tooth which could distort the result. The use of a pinhole aperture is preferred, whereby for some cases, for example when color gradients of the tooth surface are to be measured, the use of an aperture designed as a slot aperture is certainly possible as well.

When the attachment is used in a system according to the invention, the spacer 2 creates a defined distance between a capture device—sensor and optics—of the camera 1 and the aperture 4. Placing the attachment on the tooth to be measured also sets the angle between the tooth surface and the camera. When the attachment is placed flat on the tooth to be measured, the tooth surface is approximately parallel to the focal plane of the camera, whereby deviations up to about 30° are permissible, so that a sufficiently accurate capturing of the tooth color is generally possible. The attachment should be placed in such a way that, during the measurement, the tooth surface to be measured is positioned centrally under the aperture, and thus in the center of the camera image.

For explanation purposes, it should also be noted that a deflecting mirror is typically a component of a 2D or 3D intraoral camera. These deflect the imaging beam path by a fixed angle (107° in the case of the CEREC Omnicam specified above). The angle, which is set by the attachment according to the invention, is the angle between the central beam of the imaging optics and the surface to be measured. For the sake of simplicity, however, in this case here we refer to "the orientation of the surface to be measured relative to the camera". When the attachment is placed on the tooth with its flat side, the surface to be measured is in a defined orientation relative to the camera. The spatial angle, within which the camera can capture image data, is restricted by the aperture as well.

Figure 2:
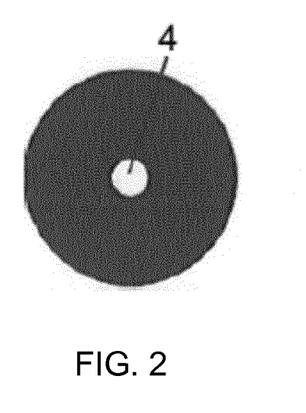
FIG. 2 shows a pinhole aperture according to the present invention.

FIG. 2 shows a single aperture in the form of a pinhole aperture 4.

Figure 3:
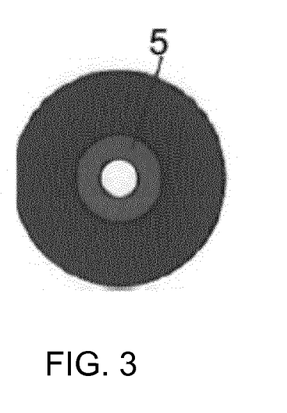
FIG. 3 shows a pinhole aperture with a silicone support according to the present invention.

FIG. 3 also shows a pinhole aperture 4, for which, unlike the pinhole aperture of FIG. 2, a silicone support 5 is provided. With the exclusion of the aperture opening, the silicone support 5 can cover the pinhole aperture 4 completely (not depicted) or partially.

Since the aperture 4 forms the front end of the attachment 10 (FIG. 1), the silicone support 5 of said aperture rests on the tooth when the attachment is placed on said tooth and conforms at least partially to the surface thereof, as a result of which it can, for one, not slide away. On the other hand, due to its flush fit on the tooth, the silicone support can prevent the entry of interfering scattered light, which ultimately makes a more accurate color determination of the respective tooth possible, so that the captured color can then be used without further correction for the color design of a tooth replacement. Lastly, the placement of the attachment also sets the angle between the tooth surface and the camera. When the attachment is placed on the tooth to be measured, the tooth surface is approximately parallel to the focal plane of the camera, whereby deviations up to about 30° do not have a significant effect on the result. When the attachment is placed on the tooth, the depth of the tooth surface is approximately in the focal plane of the imaging optics of the camera.

Figure 4:
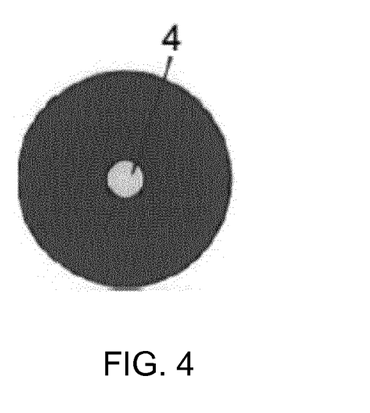
FIG. 4 shows a pinhole aperture with imaging optics according to the present invention.

The spacer 2 can be provided with imaging optics 6 (not shown), which are inserted into the hole of the pinhole aperture, for example, or arranged behind the pinhole or slot aperture. The imaging optics can advantageously enlarge the image of the captured region on the detecting sensor of the camera. The color information could thus be measured using a greater number of pixels and a more robust result could be achieved. The imaging optics can optionally fill the pinhole aperture completely. More and/or better data can potentially be obtained with the imaging optics 6 than without said optics.

According to the invention, the system further comprises means for color calibration, wherein the means can comprise software and/or hardware. The hardware preferably comprises a color calibration set with reference colors for calibration. The color calibration set is in particular designed as a color pattern with a variety of target colors for calibration. Such a color pattern is preferably mounted on the inner side of the attachment, in particular in the area of the pinhole or slot aperture. By providing such a color calibration set, color matching, including a calibration, of the captured image can be carried out in parallel by the software during every recording of a tooth color via the pinhole or slot aperture. Aging and temperature effects, the latter of which are caused by the camera-internal light source, for example, can be compensated or corrected by means of a color calibration set mounted on the inner side of the attachment. Aging effects of the image sensor of the camera, for example, can also be compensated or corrected in this manner.

Changes in the system, in particular aging effects, can also be compensated or corrected by means of an external color calibration set. To do this, the system can comprise an additional attachment, which is provided with reference colors and is placed onto the camera at predetermined time intervals, for example at weekly intervals, to thereby perform a calibration. The measured values are then stored by the software to be used as a comparison value for a color measurement of a tooth.

A defined, well-known color pattern (reference colors) is typically used for a calibration and, in a next step, the parameters responsible for the color perception of the system are corrected/optimized by means of a target/actual adjustment.

The system in particular analyzes the data acquired during the color measurement of a tooth on the basis of a color calibration and outputs the result in the standard colors of manufacturers of material for tooth replacements. A color selection for material for tooth replacement can thus advantageously be carried out automatically.

A known color scale (e.g. Vita Shade Guide) is used to classify different tooth colors, wherein the software stores color information "learned" during measurements of color patterns/reference colors.

The color measured by the image sensor of the camera is a function of a variety of different system characteristics. The most important are:
- the brightness and spectrum of the light source;
- the distance from the light source to the surface and the inclination of the surface in relation to the light source;
- the position and alignment of the surface in the measurement field of the sensor;
- aging and temperature effects of the sensor and the LEDs.

A calibration of the system in the previously described manner makes sense, in particular, to be able to take those of the previously mentioned parameters that change or can change over time into account. Stated more simply, the intent is to correct temporal changes in the color measurement properties of the system by means of the calibration. The system could furthermore also be designed in such a way that it comprises different attachments, for example attachments with different apertures and/or different coverage angles and/or different optics and/or differently sized coverage surfaces and/or different silicone attachments (for example for different teeth). For this purpose, the system can be designed such that it calibrates automatically with regard to the respective attachment, which, in particular in the context of the previously mentioned real-time calibration that uses reference colors integrated into the attachment, is easy to accomplish.

The system receives input data as images which are captured by the camera 1, or as data which is based on the images captured by the camera 1. Captured images can thus advantageously be processed and used for color determination.

The system can furthermore detect changes in the image field captured by the camera 1 and consequently switch to a color measurement mode. A color measurement can therefore be carried out advantageously quickly and without additional intermediate steps. With said system, a color measurement is also initiated automatically or by means of foot switches. Therefore, with the system according to the invention, a color measurement can advantageously be initiated intentionally when a foot switch is actuated, or automatically when no shaking or a uniform color is detected by the 2D camera 1.

The system analyzes the acquired data on the basis of a color calibration and outputs the result in the standard colors of manufacturers of material for tooth replacements. This can be carried out by means of the software. A color selection for material for tooth replacement can thus be carried out automatically.

Figure 5:
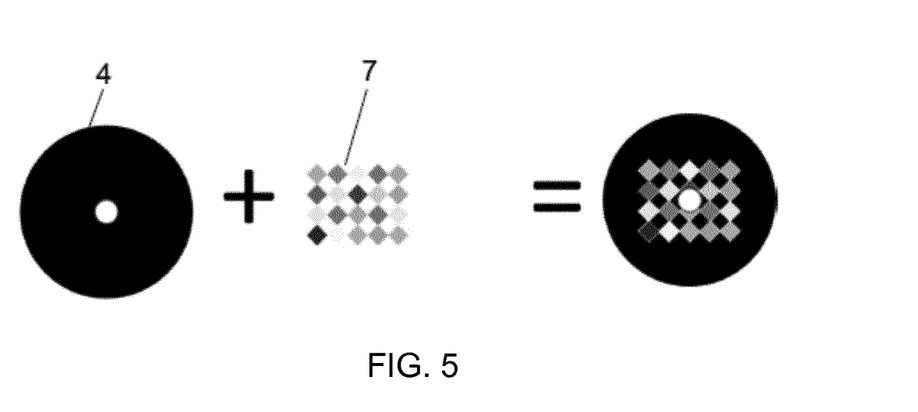
FIG. 5 shows a pinhole aperture and a color calibration set according to the present invention.

For calibrating the system in the previously mentioned manner, the aperture 4 of the system can be provided on its inner side with a color calibration set 7 composed of reference colors. Systems for color determination according to the present invention require a color calibration at regular intervals, to compensate for small deviations in the lighting spectrum and the imaging system. Target colors are typically recorded within the context of such a color calibration. These make it possible to adjust the system response by means of a calibration. In the aforementioned color calibration set 7, the reference colors are applied to the inner side of the aperture 4. In this way, for every recording of the tooth color by the aperture 4, a color matching, including a calibration, of the captured image can be carried out as well.

A method for determining the color of teeth or tooth surfaces first comprises fitting the attachment 10 to the 2D camera 1. FIG. 1 shows the system according to the invention after this step has been performed. The geometry of the image to be captured is then set by the attachment 10 in such a way that the distance, orientation and spatial angle for image capturing are limited for the camera in relation to a tooth surface to be measured, and an intraoral image of a geometrically defined specific section of teeth or of a tooth is subsequently captured by means of the 2D camera 1 in conjunction with the attachment 10.

For the case in which only single-colored ceramics are used as a restoration material for teeth, a one-time image acquisition or measurement is sufficient. However, if the use of multicolored restoration materials, such as with color gradients for example, is intended, as many measurements as necessary for color determination can be performed using the system according to the invention.

It should further be noted that the tooth color is determined from the recorded image data using a statistical analysis, such as averaging, for example. In particular the image data recorded from the interior of the (pinhole) aperture is advantageously used for this purpose.

A color calibration is performed by capturing an image and comparing data of the captured image with predefined or acquired color data, wherein the color data are predefined by means of the software or are based on the acquired data of the color calibration set 7 with reference colors for calibration that is provided in the interior of the aperture 4 on the attachment 10 (see FIG. 5).

The data of the captured image is analyzed on the basis of the color calibration and the result of the analysis is preferably output in the standard colors of manufacturers of material for tooth replacements, so that the data no longer has to undergo further processing before a restoration material with the appropriate color variant can be selected by the practitioner/dentist.

The system is preferably designed in such a way that it recognizes the presence of an attachment on the camera. This could, for example, be accomplished on the basis of changes in the image field captured by the 2D camera 1 that would lead to an automatic switchover to color measurement. A switchover could possibly also be accomplished via a command initiated by the user.

Figure 6A:
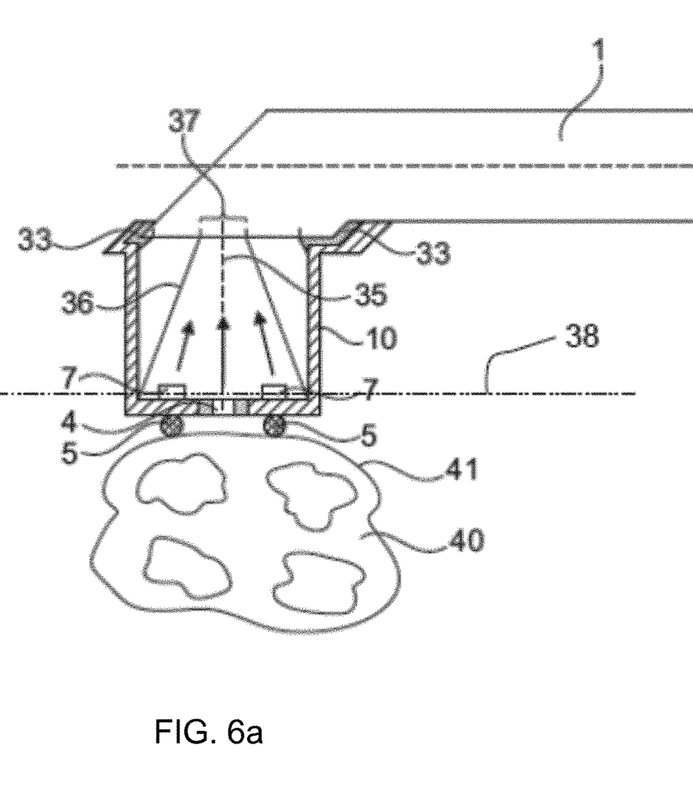
FIG. 6*a* shows a schematic demonstration of a system according to the invention.

Turning to FIG. 6a, where a schematic overview of the process of color determination of a tooth 40 with the above described system according to the invention is given. The camera with central axis 34 has a camera opening 37 with an optical axis 35 including an angle ranging from 75 to 135° to the center axis 34, where in the scheme of FIGS. 6a and 6b an angle of 90° is shown. Camera opening optical axis (see FIG. 6b) and attachment optical axis are collinear and are demonstrated in FIG. 6 as one axis 35. A light tight contact of the attachment to the area circumferential to the camera opening 37 is provided by bearing surfaces 33, which prevent that stray light or light from others than the light source of camera 1 disturb or interfere with the color determination by the camera 1 in combination with the attachment 10. Another realization of a light tight contact to at least the circumferential area of the camera opening 37 can be provided by a form fitting shaped part of the attachment 10.

An aperture 4 in the attachment 10 defines the attachment optical axis which correspond to the optical axis 35 of the camera opening 37. Further in the field of view and the illumination cone 36 of the camera light source, at least one color calibration pattern 7 on the inside of the attachment 10 is located. In case of FIG. 6a, the patterns 7 are located in the same plane and adjacent to the aperture 4. On the outside at least one support 5 for a determined and stable contact to the surface 41 of a tooth 40, which color is to be determined, is provided. A support 5 can be for example the before mentioned silicone ring.

Within this configuration, the light cone 36 illuminates the tooth surface 41, which color is to be evaluated and at the same time the reference color patterns 7, thus enabling referenced or direct calibrated color determination of the tooth surface 41 by the image recorded by the camera 1, as previously described.

Figure 6B:
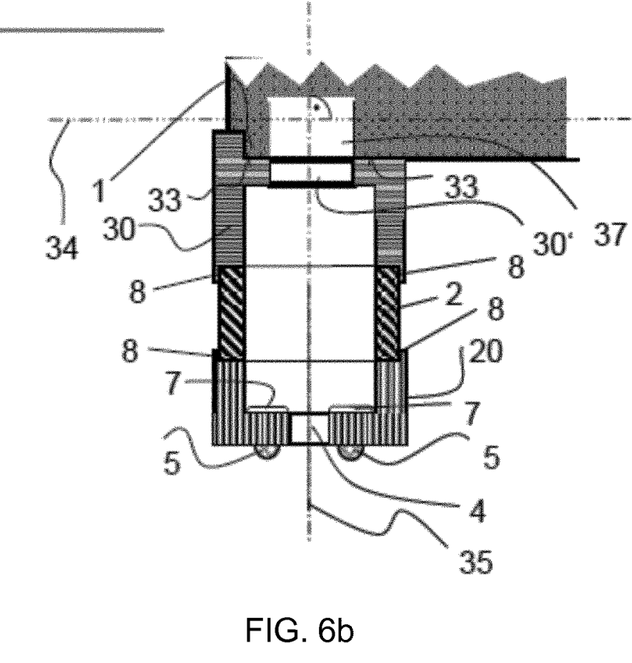
FIG. 6*b* shows a close up of the attachment of the system shown in FIG. 6*a* with a holder, a spacer and an adapter.

FIG. 6b shows a close up cross section view of the attachment 10 of FIG. 6a. The optical axis 38 of the camera opening 37 and optical axis 35 of the attachment 10 are collinear and thus can be represented as one axis and have the same angle to the camera center axis 34 of in this case 90°. In this embodiment, the attachment 10 comprises three components, a holder 30, which provides a connection via a connecting means 3 (not shown in FIG. 6b) to the camera 1 and at least a light tight contact to the area circumferential to the camera opening 37, which is indicated by the bearing surfaces 33 around a corresponding holder opening 30', an adapter 20, comprising before mentioned aperture 4 and a color reference pattern 7 on the inside and supports 5 on the outside, that is on the side oriented to a tooth surface in use and a transition piece or spacer 2, which provides the corresponding distance for the adapter 20 to the camera opening 37 in regard to a correct imaging distance for the built in camera optics. The spacer 2 provides that at least the color reference pattern 7, and optionally further the aperture 4, are located close to the focal plane of the camera 1. It is preferred that the color reference pattern 7 and the aperture 4 are located in the focal plane of the camera 1. All components are removably connected, so that for example different spacers 2 according to the invention, corresponding to different camera optics and/or models, can be used to provide the correct spacing of the adapter component 20 with regard to the focus plane of the used camera 1.

In the same manner, this applies as well to the holder 30 and the adapter 20, wherein for the latter different adapters 20 with different apertures 4 can be used, while in case of the holder 30, different holders for different camera bodies can be provided. The connection between these elements are formed as light tight connections, as for example sliding, clipping or engaging mechanisms and thus preventing a not controlled and/or defined illumination of the reference pattern 7, and the tooth surface 41 through the aperture 4. In alternative embodiments, the spacer 2 can be part of either the holder component 30 or the adapter component 20 or partially part of both components. Further, the complete attachment can also be provided as one-part element.

Figure 7:
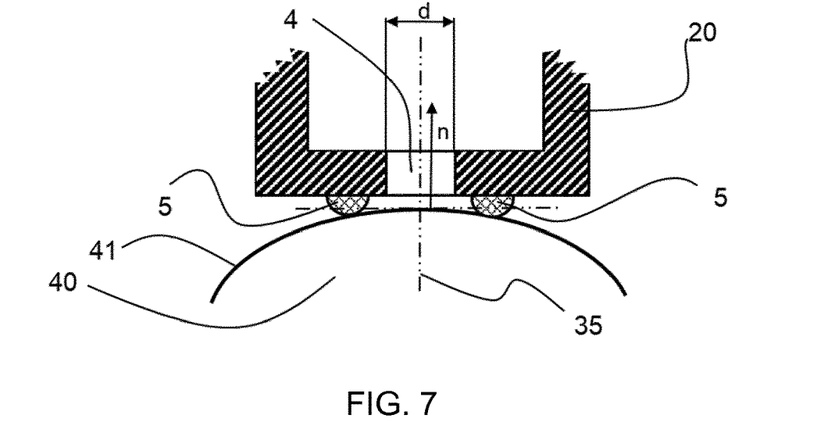
FIG. 7 shows a schematic cross section of the adapter of an attachment when placed on a tooth.

A more detailed presentation of the interaction of the attachment 10, in particular the adapter 20, at the tooth surface 41 is given by the schematic cross section view of FIG. 7. As shown in the embodiment of the adapter 20 in FIG. 7, the aperture 4 has defined diameter d determining the actual illuminated area on the tooth surface 41, which is used for evaluation of the color. Here a cross section area of the aperture of at least less than or equal to $0.5$ cm$^2$, less than $0.35$ cm$^2$ or $0.15$ cm$^2$ is preferred, where the minimum area is not less than $0.01$ cm$^2$. This area results in a first approximation in a corresponding illuminated surface area of about the same size on the tooth 40, since there is a short distance between aperture and tooth surface 41 with regard to the divergence of the optical system$_{[1][2]}$. However, these values serve as guidance for those skilled in the art.

The particular area of the aperture depends on the resolution and contrast capabilities of the camera and the corresponding intensity of the light source. Further the supports 5 are in contact with the surface 41 of tooth 40, providing a defined orientation in space of the adapter and therefore for the system comprising of attachment 10 and camera 1. In case of FIG. 7, the attachment optical axis 36 is parallel to the normal vector n of the tooth surface 41.

Figure 8:
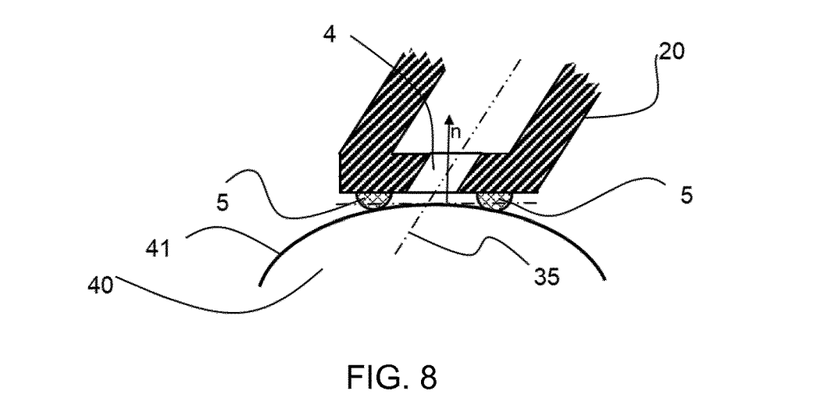
FIG. 8 shows the schematic section of FIG. 7 for another embodiment with different orientation of the optical axis to the tooth surface.

A different embodiment is shown in FIG. 8, where the attachment optical axis 35 is angled with respect to the normal vector n of the tooth surface 41. However, in both embodiments a defined orientation of the attachment 10 to the tooth 40, in particular to the tooth surface 41, which is to be evaluated regarding the color, is established by the supports 5 in combination with the adapter 20.

Figure 9:
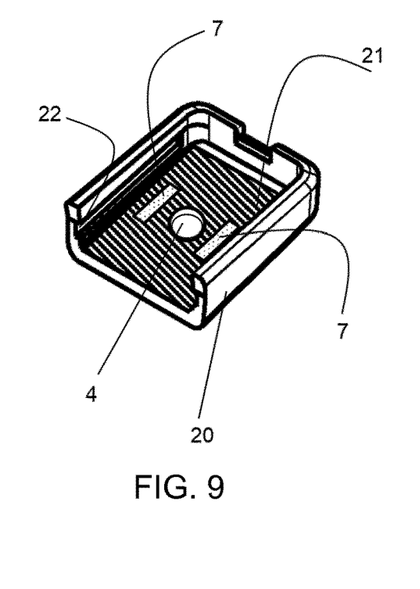
FIG. 9 shows a perspective view of an adapter of the attachment with a circular/pinhole aperture.

FIG. 9 gives a perspective view of the adapter of the attachment. The adapter 20 comprises a front side 21, which defines the distal end of the optical path to the camera opening of the attachment 10. At the front side 21, an aperture 4 with a circular shaped base and reference patterns 7 for the color determination are located. Further, the adapter comprises a connecting means 22, which provide a light tight connection together with their counterparts on the holder 30 shown in the embodiments of the holder of the attachment in FIGS. 14 to 17 or with the respective counterparts on the spacer 2 in case of attachment 10 comprising three components. On the outside of the front side 21 (not shown in FIG. 9), the support 5 (FIG. 7, 8) is located.

Figure 10:
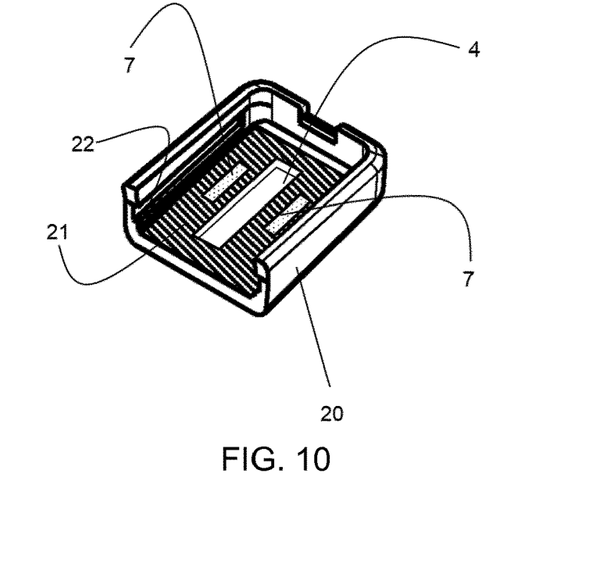
FIG. 10 shows a perspective view of an adapter of the attachment with a rectangular/slot aperture.

A different embodiment of the adapter with an aperture with a rectangular/slot shaped base, that enables to determine a color gradient on a tooth surface, is shown in FIG. 10.

Figure 11:
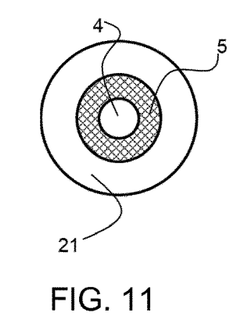
FIG. 11 shows a schematic view of a front side of an adapter of an attachment with a support, circumferentially enclosing the aperture.
Figure 12:
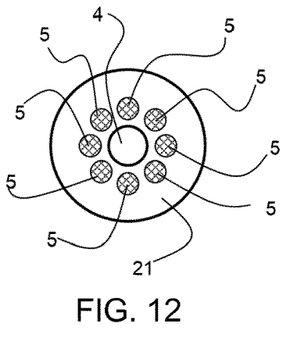
FIG. 12 shows a schematic view of a front side of an adapter of an attachment with supports adjacent to the aperture having a circular shaped base.
Figure 13:
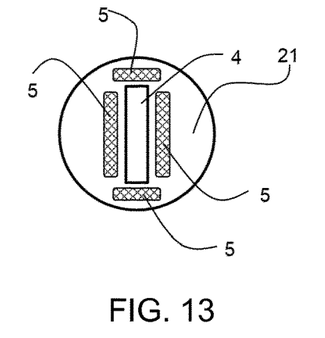
FIG. 13 shows a schematic view of a front side of an adapter of an attachment with supports adjacent to the aperture having a rectangular shaped base.

FIGS. 11 to 13 show different embodiments of the support 5 on the outside of a front side 21 of the adapter 20. In FIG. 11 an embodiment is shown where the support 5 circumferentially encloses the pinhole aperture 4, thus providing advantageously a light tight contact to the tooth 40, which prevents any secondary illumination of the tooth surface 41 or that any stray light or other unwanted light enters the attachment via the aperture 4, disturbing the color determination. Such a support can be realized by above mentioned silicone ring or by another elastic material or elastomer.

In FIG. 12, an embodiment with a plurality of supports 5 with a round shaped base is shown, where the supports 5 are located adjacent to the aperture 4. FIG. 13 shows an embodiment with a rectangular/slot formed aperture 4 and corresponding rectangular base shaped supports 5.

In general, all these configurations of the above mentioned FIGS. 11 to 13 may also include that the support is partially recessed into or protruding the front side 21 or may be partially or completely part of the front side 21 itself. Areas of the front side 21 can comprise elastic materials and/or can be riffled or otherwise contoured to provide increasing grip onto the tooth surface 41, as for example the areas indicated as base areas of the supports 5 on the front side 21 in FIGS. 11 to 13. The front side can also be formed by two layers, the layer on the outside facing the tooth surface 41 can be elastic and thus providing stable and determined contact with regard to the orientation of the attachment 10 to said tooth surface 41. Further, the front side can serve as support itself without any of the above mentioned modifications, as a sufficient defined and stable contact to the tooth surface can be provided by the friction and surface pressure. However, in this case enhancements with regard to stable and determined contact with regard to the orientation of the attachment to the tooth surface 41 can be achieved, if material of the front side 21 is made of soft or partially elastic material, such as soft plastic.

Figure 14:
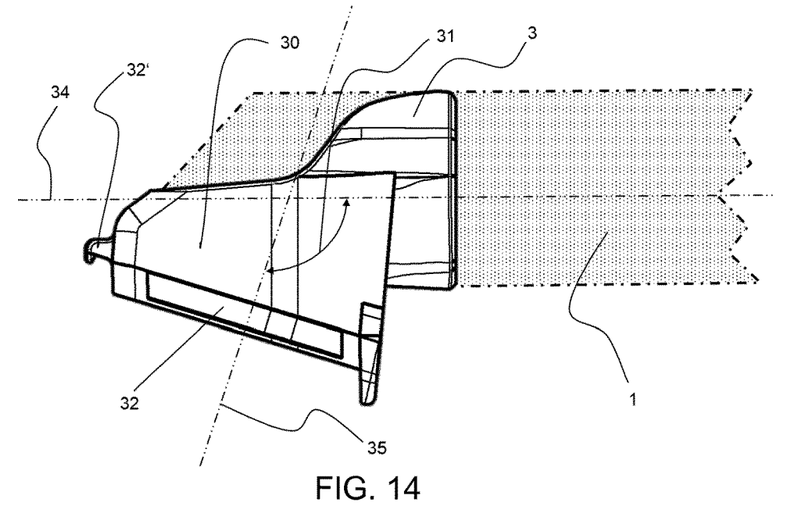
FIG. 14 shows a side view of a holder of an attachment demonstrating the fixation and location of a camera therein.

FIG. 14 shows a side view of a holder 30 of an attachment 10. The previously shown adapter 20 is connected either directly via the connecting means 32 and 32' to the holder or via corresponding connecting means of the spacer 2 (if the attachment 10 with three components), shown in FIG. 6*b*. A light tight connection is provided by the engagement of the connecting means 22 of the adapter and the corresponding counter parts 32 and the additional connecting means 32' of the holder. This enables on the one hand to use different adapters, e.g. with different apertures in combination with different holders, for example for different camera bodies and, in case of an attachment 10 with three components, see FIG. 6*b*, different spacers 2 and at the same time prevents that disturbing light from the environment infers the color determination. The holder 30 itself is connected to camera 1 by a connecting means 3. In this embodiment, the holder 30 is adjusted to provide an attachment optical axis 35, which corresponds to an angled optical axis of the camera opening 37 (FIG. 6*b*) of a camera such as the CEREC Omnicam of the applicant with an angle 31 of 107 degrees to camera center axis 34.

Figure 15:
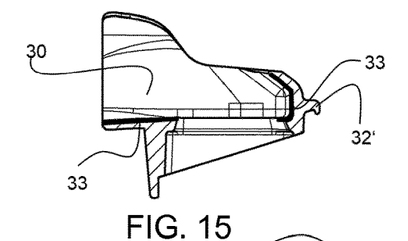
FIG. 15 shows a side cross section view of a holder.
Figure 16:
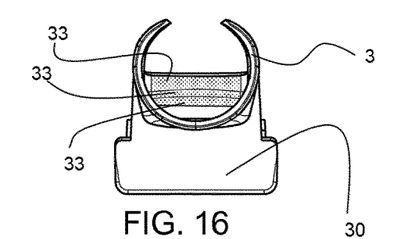
FIG. 16 shows a back view of the holder.
Figure 17:
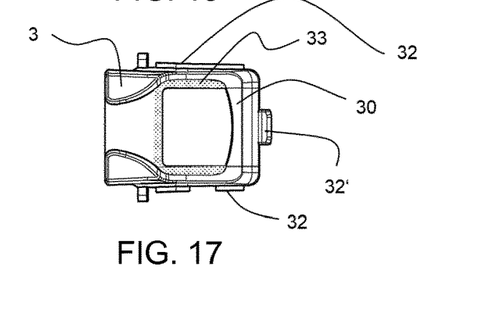
FIG. 17 shows a top view of the holder.

FIGS. 15 to 17 show different views of the holder of FIG. 14, where in particular the bearing surfaces 33 are indicated. These surfaces provide a light tight contact of the attachment to the camera 1 (not shown) in particular around the camera opening 37 (not shown). Also the connecting means 32 and 32' are shown, which are formed as elements for a latching 32' and sliding 32 connection between adapter 20 and holder 30. Further also demonstrated is the connection means 3, which provides the attachment of the holder and therefore the complete attachment to the camera. In this embodiment, the connecting means 3 is formed as a ring clamping mechanism, which has a smaller diameter than the diameter of the, in this case, bar shaped camera body. Other possible connections may be a click connection or a plug connection mechanism. The FIGS. 18 and 19 show perspective views of the holder of FIG. 14.

In the previous designs and considerations, it is assumed that the camera of the system is provided with a light source for illuminating the tooth to be measured and, if applicable, the reference color pattern.

According to the invention, a system and a method for accurately determining the color of teeth are provided, which are simple in design and also easy to use. Furthermore, according to the invention, an attachment is provided, which can easily be used in the system of the invention.

REFERENCE SIGNS

1 camera
2 spacer
3 connecting means (to the camera)
4 aperture
5 support
6 imaging optics
7 color calibration set/reference pattern
8 connecting means of the spacer
10 attachment
20 adapter of the attachment
21 front side of the adapter
22 connecting means
30 holder of the attachment
30' holder opening
31 angle between optical axis of the attachment and the camera axis
32, 32' connecting means
33 bearing surface(s)
34 camera center axis
35 attachment optical axis/camera opening optical axis
36 illumination cone
37 camera opening
38 focal plane
40 tooth
41 tooth surface

The invention claimed is:
1. System for determining the color of a tooth, which comprises:
a 2D or 3D camera and
an attachment, which is fitted on said camera, and placed on the tooth, wherein the attachment has a connecting means for fitting the attachment to the camera, an aperture via which the camera for capturing an image of the tooth, and a spacer for creating a distance between a capture device of the camera and the aperture, wherein the spacer creates a distance between the capture device of the camera and the tooth surface,
wherein the camera has a first recording mode for use without the attachment, and a color measurement mode for use with the attachment for measuring the color of the tooth,
wherein the system is adapted to recognize changes to the image field captured by the camera and to switch from the first recording mode to the color measurement mode when the attachment is fitted on the camera
wherein the attachment further comprises:
a holder, which provides a light tight connection via the connecting means to an area of the camera opening of the camera, which is circumferential to said camera opening; and
an adapter connected lighttight to the holder and comprising at least one front side in front of the camera opening at the distal end to the camera opening of the optical path of the attachment, and comprising at least one aperture and the support located at least partially adjacent the aperture.

2. System according to claim 1, wherein the connecting means has a click connection or a plug connection for easy attachment to the camera.

3. System according to claim 1, wherein the attachment at least partially comprises a support of elastic material, which is an elastomer or a silicone that is fitted to a front side so as to rest on the tooth when the attachment is placed on said tooth.

4. System according to claim 3, wherein the aperture is arranged on the front side of the spacer facing the tooth to be measured and is at least partially provided with the support.

5. System according to claim 4, wherein the spacer comprises imaging optics incorporated into the aperture or arranged from behind averted from the object to be measured.

6. System according to claim 1, further comprising software and/or hardware means for color calibration.

7. System according to claim 6, wherein the hardware means comprises a color pattern composed of reference colors.

8. System according to claim 7, wherein only white is used as a reference color.

9. System according to claim 1, wherein the system receives input data as images, which are captured by the camera, or as data which is based on the images.

10. System according to claim 9, wherein the system is adapted to analyze the acquired data on the basis of the color calibration and to output the result in standard colors of manufacturers of material for tooth replacements.

11. System according to claim 7, wherein the aperture of the system comprises the color pattern composed of reference colors on its inner side for calibration.

12. System according to claim 1, wherein the holder is attached to the camera at least by a clamping, latching, sliding, click, ring, or plug mechanism element, wherein the holder is removably connected to the camera.

13. System according to claim 1, wherein the holder comprises a holder opening corresponding to the camera opening and at least one bearing surface or form-fitting profile following the shape of the casing in which the camera opening is arranged providing a light tight connection to the at least one camera opening and wherein said at least one bearing surface or formfitting profile enables the correct positioning of the attachment on the camera corresponding to the camera opening.

14. System according to claim 1, wherein the adapter comprises at least one reference pattern facing to the at least one camera opening, and is located next to or around the aperture.

15. System according to claim 1, wherein the aperture has a rectangular shape or a circular shape and has a cross section area equal to or smaller than 0.5 cm2.

16. System according to claim 1, wherein the support
(i) is protruding the front side; and
(ii) is provided with a riffled and/or other friction or grip increasing contour.

17. System according to claim 1, wherein the spacer is,
(i) a separate component, light tight connected by another connecting means to the adapter and the holder; or
(ii) a one-part element comprising the holder and the adapter.

18. System according to claim 1, wherein the connecting means of the the-holder, the spacer and adapter are formed as one of a clamping or latching or sliding or click or ring or a plug mechanism element and are removable.

19. System according to claim 1, wherein the spacer length is adjusted with respect to the optical focal plane of the camera, so that the color reference pattern and the aperture are located close to the focal plane of the camera.

* * * * *